Sept. 26, 1939.  C. W. ZIES  2,174,485
STEAM TRAP
Filed Sept. 23, 1936
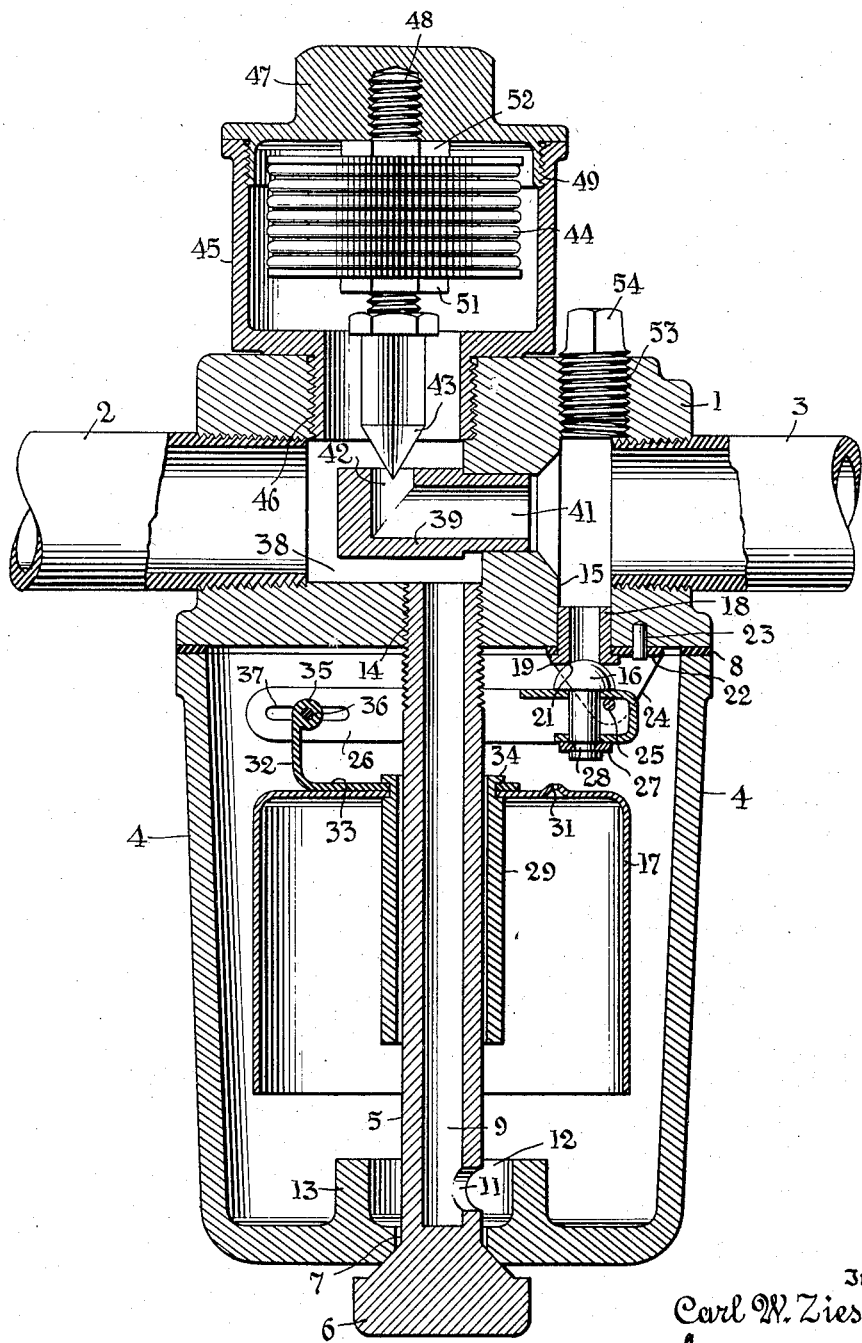
Inventor
Carl W. Zies
By Dodge and Sons
Attorneys Patented Sept. 26, 1939

2,174,485

UNITED STATES PATENT OFFICE 2,174,485

STEAM TRAP

Carl W. Zies, Lakewood, Ohio, assignor to The V. D. Anderson Company, Cleveland, Ohio, a corporation of Ohio Application September 23, 1936, Serial No. 102,237

1 Claim. (Cl. 236—53)

This invention relates to steam traps and more particularly to mechanism for the effective elimination of air from such traps.

In order to permit prompt elimination of condensate from a heating system, it is essential that means be provided for eliminating air from the system. When the system is subject to pressure from two to five pounds, there is no difficulty in securing such elimination, even though the trap outlet be closed by a water seal. However, in low pressure systems, where the pressure may drop as low as one pound or even less, air elimination is a difficult problem and requires very careful attention.

In all steam traps, and more particularly those of the inverted bucket type wherein the outlet orifice is submerged in water, considerable line pressure is necessary to air elimination. This is true regardless of whether the outlet control be exercised by a closed float or a float of the inverted bucket type. Where line pressure drops below one ounce, the air can never be eliminated through the water seal. Consequently, air elimination can be effected only by by-passing such seal.

The object of this invention is to provide automatic means for air elimination in connection with steam traps employed in systems subject to extremely low pressures. More particularly, the invention is concerned with air elimination in a steam trap of the inverted bucket type, in which prior art constructions would require all air to pass through the water in the trap bowl before reaching the outlet opening.

A further object of this invention is to provide a steam trap in which the automatic air eliminating valve is controlled thermostatically and is embodied in a unitary construction which permits removal of the trap bowl without disturbing any of the operating mechanism for the outlet valve or of the thermostatic by-pass valve.

Numerous objects and advantages will appear from the following specification when read in connection with the accompanying drawing, in which The single figure is a vertical sectional view through one form of steam trap embodying this invention. For purposes of illustration, this trap is shown as of the inverted bucket type having a Sylphon bellows controlled by-pass valve.

Referring to the drawing, reference character 1 designates a trap body having an inlet 2 and an outlet 3. Carried by the trap body 1 and secured to the lower face thereof, is a hollow bowl 4 held in place by a bolt 5 having an enlarged head 6 which comes into sealing engagement with an opening 7 in the bottom of the bowl, as indicated in the drawing. A gasket 8 seals the connection between the bottom of the body 1 and the top of the bowl.

The bolt 5 contains a longitudinal bore 9 connecting the interior of the bowl with the inlet 2. The lower end of the bore 9 contains at least one opening 11 connecting this bore 9 with a small bowl 12 formed by an upstanding flange 13 in the bottom of the bowl 4. The bolt 5 has threaded engagement with the top 1 as at 14.

The body 1 has the usual valve controlled outlet passage 15 having a valve 16 operated in response to movement of an inverted bucket float 17. As shown herein, the passage 15 has driven into it a tubular element 18, having a flange 19 forming a valve seat as at 21. The element 18 passes through an opening in a plate 22 until flange 19 abuts plate 22 and assists pins 23 in holding this plate in contact with the body 1, and in proper relation to it. Depending from the plate 22 are two ears 24 arranged to support a pintle 25 about which the bucket lever 26 is pivoted. This lever carries the valve 16, which valve is secured in position by a locking member 27 engaging a groove adjacent the bottom end of the stem of valve 16 as at 28.

The bucket 17 is perforated and is secured to the top end of a guide tube 29 embracing the bolt 5, the top of the bucket containing the usual vent opening 31. Connection between the bucket and the bucket lever is secured by means of a member 32 having a horizontal portion 33 held between the headed down portion 34 of the guide tube 29 and the top of the bucket 17 adjacent the opening therein. The vertical portion of member 32 terminates in an enlarged bearing 35 adapted to receive a pin 36 cooperating with a slot 37 in the lever 26. The guide tube 29 keeps the bucket 17 centered with respect to the bowl so that the trap can be used in either vertical or inclined position without the bucket striking the inside of the bowl. At the same time, movement of the bucket causes the valve to be moved progressively from closed to open position as the bucket drops. The effect of the bowl formed by upstanding flange 13 is to direct the incoming water and gases into the bucket 17 to render it buoyant, and to prevent the escape around the bucket, of such gases and liquid under pressure. The result of this construction is to make the bucket very sensitive so that it produces exact control.

The structure so far described is substantially similar to that shown in applicant's prior Patent No. 1,991,268, issued February 12, 1935. This construction has the advantage that the bowl can be removed by removing the bolt 5 without dismantling the outlet valve operating mechanism, and without disconnecting the trap from either the inlet or the outlet pipes.

In order to make the trap operative to eliminate air from the system, particularly in low pressure systems, i. e. systems operating at a pressure below one pound gauge, the present trap has been provided with a thermostatically controlled by-pass valve. As here shown, the body 1 contains a chamber 38 connecting the inlet 2 with the bore 9 of bolt 5. Chamber 38 is connected to the outlet 3 by an angle fitting 39 which includes a horizontal bore 41 and a vertical bore 42. The bore 42 terminates in a valve seat cooperating with a valve 43 controlled by a Sylphon bellows 44. This bellows is housed within a casing 45 having a depending tubular portion 46 screwed into an opening in the top of the body 1. The bellows 44 is secured to a cap 47 by a threaded connection 48, and this cap is secured to and closes the casing 45 by a threaded connection 49. Nuts 51 and 52 serve to adjust the bellows 44 in relation to the valve 43 so as to make the valve operable at any desired predetermined temperature.

In addition to the openings just described, the body 1 contains a threaded opening 53 at the top closed by a plug 54. This plug, when removed, permits direct access to the valve seat associated with valve 16 for cleaning purposes. Accordingly, when the bowl 4 is removed, and the valve 16 disconnected, the plug 54 may be removed and a swab pushed through from top to bottom of the body 1 to eliminate any accumulations of sediment or scale which may have formed therein.

The operation of the trap herein shown and described is as follows:

When the heating system, in which this trap is connected, is cold, the bellows 44 remains contracted in the position shown in the drawing, so that the by-pass is open. Consequently, air may pass directly from the inlet 2 through the bores 42 and 41 to the outlet 3. Under these conditions, the bucket 17 will be in its lowermost position, holding the outlet valve 16 open. Whatever water may be present in the bottom of the bowl 4, constitutes a water seal between the opening 11 and the outlet 3. Consequently, no air can be eliminated by this passage until the pressure in the inlet is sufficient to overcome the sealing action of this liquid. However, the bellows 44 holding the by-pass valve open, permits adequate and effective elimination of air from the system regardless of what position the bucket 17 may occupy, or of what the depth of the water in the trap body may be. If the pressure in the system is sufficient to overcome the effect of the water seal in the bowl 4, but the temperature is not high enough to close the by-pass valve, air elimination may occur through both the by-pass valve and through the water seal in the bowl 4.

When the temperature of the trap rises sufficiently to cause the bellows 44 to close the by-pass valve 43, then any further air elimination which may occur must take place through the water seal in the trap, and thence through the bucket vent 31.

The effect of providing the thermostatically operated by-pass valve is to permit the elimination of air under pressures substantially lower than ever before, this trap being able to operate at pressures as low as a fraction of an ounce. At pressures sufficient to break through a water seal and up to fifty pounds, the trap operates in the same manner as traps heretofore known, but the air elimination is quicker due to the additional path provided for the air. The trap, therefore, has the advantage of operating effectively to eliminate air over a greater range than ever contemplated before in this art. At the same time, the by-pass valve is a unitary construction with the steam trap, and requires no additional connections or fittings for its installation. Since the by-pass mechanism is embodied in the top of the trap, it does not interfere in any way with removal of the trap bowl for cleaning and inspection.

While it has been indicated in the present disclosure that the by-pass valve is operated by a sylphon bellows, it is to be understood that the invention is not limited to this particular thermostatic means. The Sylphon bellows is a well known piece of mechanism which has become standardized and dependable, but other types of thermostatic controlling means can be used without departing from the spirit and scope of this invention.

While it has been suggested before in the art to provide thermostatic by-pass for steam traps, the constructions known have never been capable of operating to eliminate air at pressures below those required to force air through a water seal.

What is claimed is:

A steam trap comprising a body containing a chamber having an inlet and an outlet, and a bowl depending from said body; a valve for controlling the connection of said bowl to said outlet; an inverted bucket float in said bowl for controlling said valve; a by-pass connection in said chamber isolated from said bowl and directly connecting said inlet and outlet, said connection comprising a tubular portion projecting inwardly from a wall of the chamber and having a valve seat therein; a hollow casing removably mounted on the top of said body above said valve seat and in communication with said chamber; a by-pass valve cooperating with the valve seat in said by-pass connection; and thermostatic means in said hollow casing and connected to said by-pass valve for opening and closing said by-pass in accordance with temperature conditions in said trap.

CARL W. ZIES.